T. RODES.
METHOD FOR SAWING TAPERED LOGS.
APPLICATION FILED AUG. 25, 1914.
1,146,655.
Patented July 13, 1915.
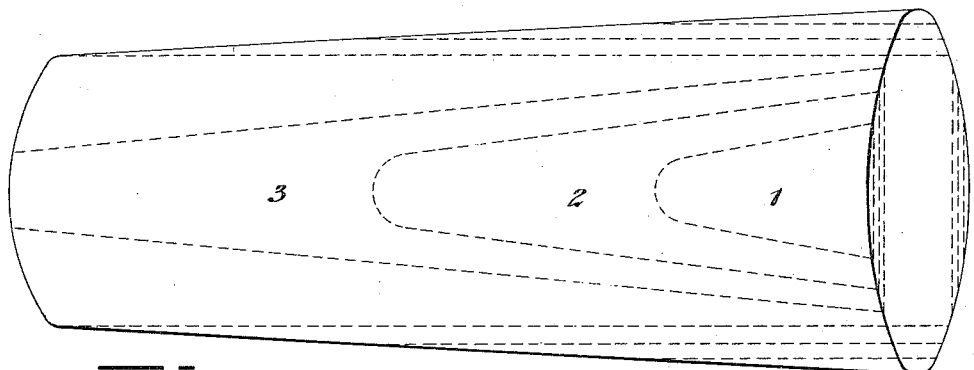
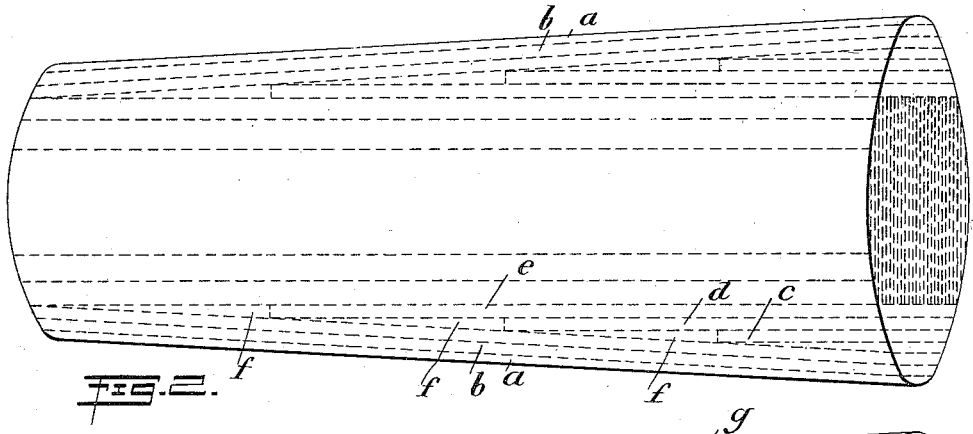
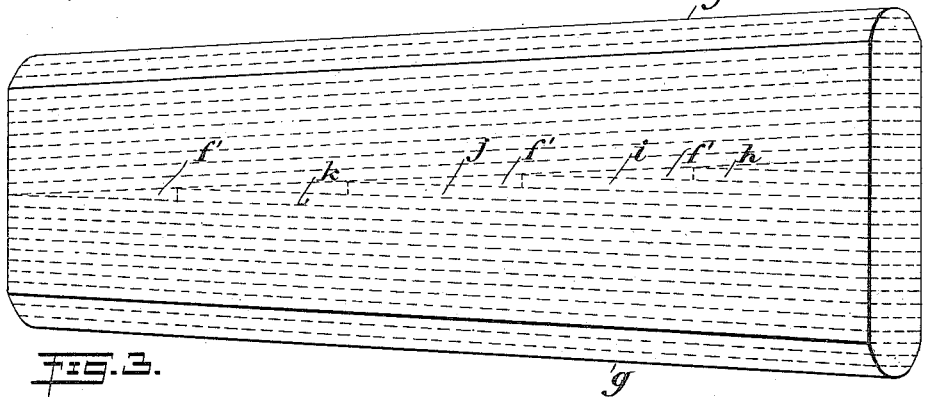
WITNESSES
INVENTOR
Tyree Rodes
BY
ATTORNEYS

UNITED STATES PATENT OFFICE.

TYREE RODES, OF NASHVILLE, TENNESSEE.

METHOD FOR SAWING TAPERED LOGS.

1,146,655.   Specification of Letters Patent.   Patented July 13, 1915.

Application filed August 25, 1914. Serial No. 858,456.

*To all whom it may concern:*

Be it known that I, TYREE RODES, a citizen of the United States, and a resident of Nashville, in the county of Davidson and State of Tennessee, have invented a new and Improved Method for Sawing Tapered Logs, of which the following is a full, clear, and exact description.

My invention relates to a new method of sawing tapered logs into boards whereby a greater saving of lumber is obtained with a lesser manipulation of the same than hitherto.

My method consists in cutting a tapered log so as to form a flattened frustocone, which is then trimmed by cutting off boards from the sloping sides parallelly to the slope of said sides.

Reference is to be had to the accompanying drawings forming a part of this specification, in which like characters indicate corresponding parts in all the views and in which—

Figure 1 illustrates the method employed at present for sawing tapered logs; and Figs. 2 and 3 show my method of sawing tapered logs.

The method of sawing logs employed at present consists in sawing the tapering log from the beginning to the end parallel to the axis of the log (see Fig. 1), that is, forming the frustocone-shaped log into a quadrangular prism, thus sawing off tapering boards 1, 2 and 3, which must be edged off to form straight boards and, consequently, cause great waste.

In my method, shown in Figs. 2 and 3, I first saw or trim the frustocone-shaped log by sawing off the slab $a$ and the board $b$ parallelly to the slope of the log, so as to form diametrically opposite converging sides which are then trimmed by cutting off boards $c$, $d$ and $e$ parallelly to the axis of the log, thus forming from the frustocone-shaped log a flattened frustocone in which the flattened sides are parallel. The slab $a$ and the board $b$ so sawed off are substantially of the same width from end to end and, therefore, $b$ can be utilized as a board with very little edge trimming. The boards $c$, $d$ and $e$ cut from each of said sides of the log are trimmed by removing the parts $f$. The so flattened frustocone is then cut into boards by sawing off the boards parallelly to the slopes $g$ from each side toward the center, as shown best in Fig. 3. By this method boards $h$, $i$, $j$ and $k$ are formed in the center of the log. In the boards $h$, $i$, $j$ and $k$ the portions $f'$ are also removed so that the only waste with my method is the portions $f$ and $f'$.

By my method of sawing a tapered log, I cut off short boards from the inside of the log, *i. e.*, from the broadest surface necessary to size up the cant so it will be the same size at both ends. Furthermore, by my method I make no tapered boards, as all boards have parallel edges at both ends when cut from a tapered log. By cutting the short boards from the inside broader surface, they measure about four times the width as the same cut from the outside of the log, as shown in Fig. 1. By my method also the boards, including the short ones, are so cut that they are either all sap or all heart, that is to say no board has one end sap and the other end heart, and consequently there is no mixing of the grades in a board. With my method the gain in lumber on a log twenty-four inches at the small end, thirty inches at the large end and sixteen feet long is about seventy-five feet.

Having thus described my invention, I claim as new and desire to secure by Letters Patent:

1. The method of sawing a tapered log consisting in cutting the log parallelly to the slope, so as to form diametrically opposite sloping sides to substantially the square of the log, then cutting off boards from the so formed sides parallelly to the axis of the log, thus forming a flattened frustocone, the flattened sides of which are parallel, then cutting the flattened frustocone into boards from each of the sloping sides parallelly to the slope of said sides and substantially perpendicular to the parallel sides.

2. The method of sawing tapered logs, consisting in cutting the log parallelly to the slope, so as to form diametrically opposite sloping sides to substantially the square of the log, and then cutting off boards from the so formed sides parallelly to the axis of the log, thus forming a flattened frustocone, the flattened sides of which are parallel.

In testimony whereof I have signed my name to this specification in the presence of two subscribing witnesses.

TYREE RODES.

Witnesses:
Louis Kramer,
Jos. F. Kramer.